Feb. 18, 1964    J. A. COLENSO    3,121,586
STATION WAGON FOLDING FLOOR
Filed Sept. 14, 1960    3 Sheets-Sheet 1

JOHN A. COLENSO
INVENTOR.

BY John C. Faulkner
John J. Loethel
ATTORNEYS

Feb. 18, 1964   J. A. COLENSO   3,121,586
STATION WAGON FOLDING FLOOR
Filed Sept. 14, 1960   3 Sheets-Sheet 2

JOHN A. COLENSO
*INVENTOR.*

BY John L. Faulkner
John J. Loethel
ATTORNEYS

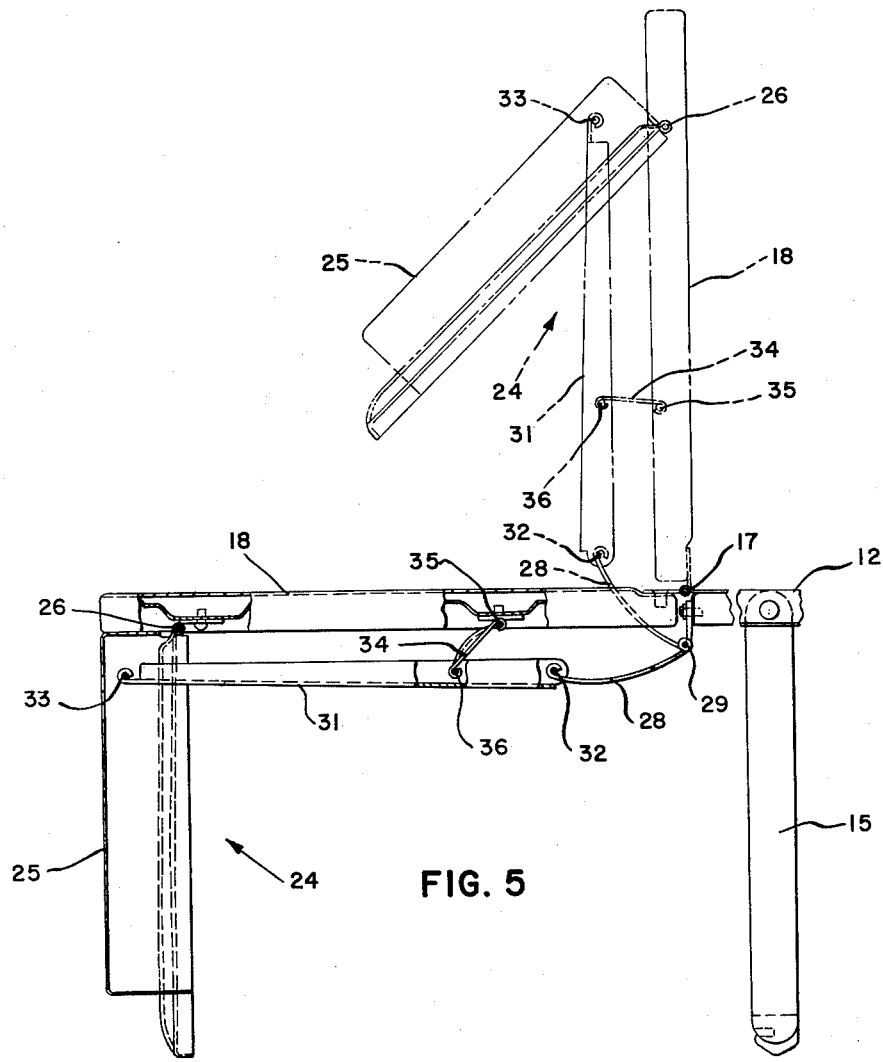

United States Patent Office 3,121,586
Patented Feb. 18, 1964

3,121,586
STATION WAGON FOLDING FLOOR
John A. Colenso, Dearborn, Mich., assignor to Ford Motor Company, Dearborn, Mich., a corporation of Delaware
Filed Sept. 14, 1960, Ser. No. 56,014
7 Claims. (Cl. 296—66)

This invention relates to motor vehicles of the station wagon type and more particularly to a foldable floor panel for such vehicles.

Motor vehicles of the station wagon type generally provide a passenger seat to the rear of the driver's seat which can be folded into the vehicle floor to present an unobstructed surface between the rear of the driver's seat and the remainder of the floor for cargo carrying space. Such seats generally include two sections joined together to form a seat back when folded into the upright position. These sections also form the floor panel when extended into the cargo carrying position. One of the sections is folded down against the seat cushion in the cargo carrying position and the other section is extended to form the floor extension between the back of the driver's seat and the first section. Such structures generally include a manually erectable means for supporting the free end of the floor extension section of the panel when in its cargo carrying position. This additional support means is, for the most part, cumbersome and awkward to operate.

This invention provides a support for the floor extension section which is operated by a linkage system that automatically and positively positions the support when the floor panel is extended to the cargo position and retracts the support when the floor panel is folded upward to form a seat back.

Other objects and advantages of this invention will be made more apparent as this description proceeds, particularly when considered in connection with the accompanying drawings wherein:

FIGURE 5 is a side elevation of a portion of the floor panel showing it in its cargo carrying position with portions broken away to more clearly show the construction and showing, in phantom, the floor panel in a partially folded position.

Figure 1:
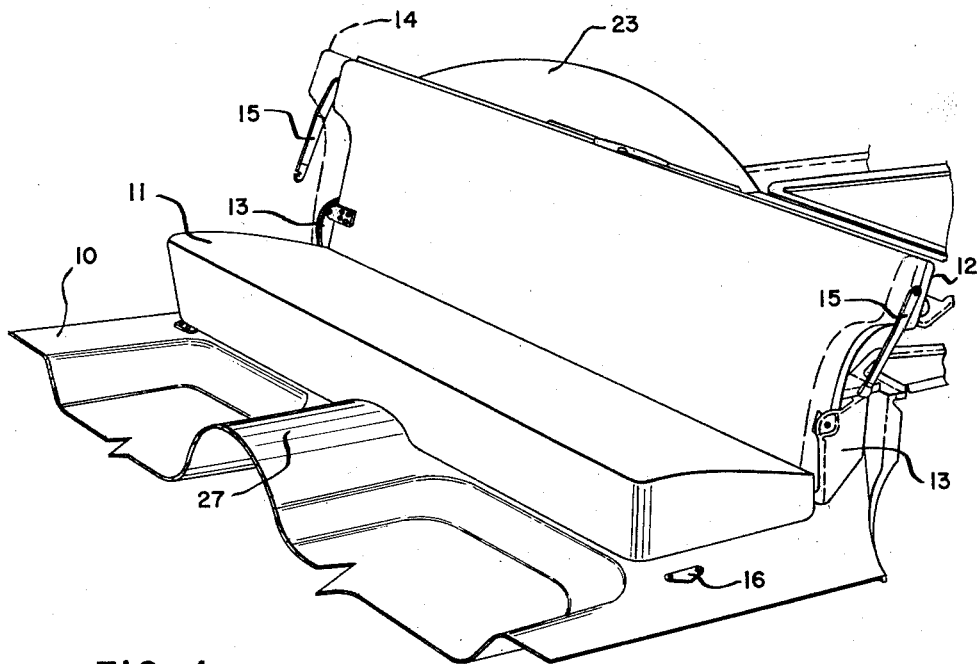
FIGURE 1 is a perspective view of a portion of the vehicle interior showing the floor panel in its upright position.

Referring now to the drawings, and more particularly to FIGURE 1, there is shown a vehicle floor 10 to which is secured a stationary passenger seat cushion 11. A seat back section 12 is hinged at brackets 13 secured to the vehicle floor 10 for swinging movement from the upright position shown in FIGURE 1 to the cargo carrying position shown in FIGURE 2. The seat back section suitably supports back cushion 14. The seat back section pivotally supports legs 15 which cooperate with pads 16 on the vehicle floor 10 to support the seat back when folded into the cargo carrying position shown in FIGURE 2.

Referring now to FIGURES 2 through 5, a hinge 17 connects a floor extension section 18 to the top of seat back section 12. These two sections form the complete folding floor panel. Tension springs 19 are suitably secured internally to the floor panel sections and serve as a counter-balance to allow easier folding of the panel sections. A catch 21 is secured to the floor extension section 18 and coacts with the seat back section 12 to maintain the extension in the folded position shown in FIGURES 1 and 3. The extension section 18 also supports bracket 22 which coacts with a latch mechanism (not shown) carried by the wheel housing 23 to lock the folded seat back section in its upright position.

Figure 4:
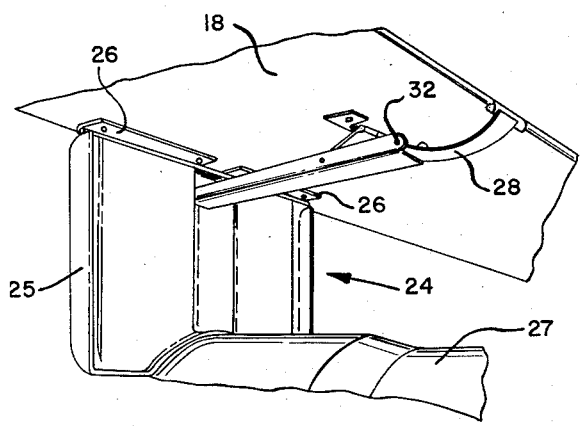
FIGURE 4 is a perspective view from the back showing the floor panel extension in the cargo carrying position.
Figure 2:
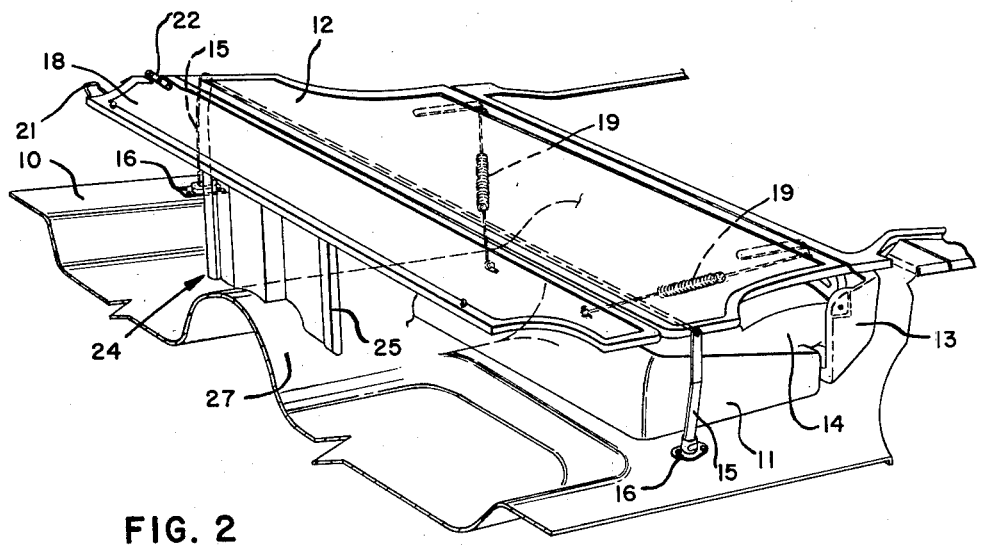
FIGURE 2 is a view similar to FIGURE 1 showing the folded floor panel in its cargo carrying position.
Figure 3:
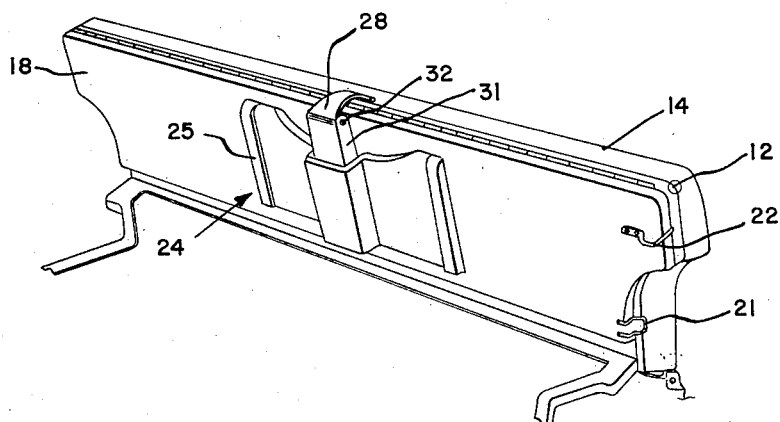
FIGURE 3 is a perspective view of the rear of the folding floor panel as it appears when serving as a seat back.

The floor panel extension section 18 mounts an assembly, generally indicated at 24, which serves to support this section when extended in the cargo carrying position. The support assembly includes a support panel 25 hinged at 26 to the extension 18 for swinging movement. This panel supports the extension section in its cargo carrying position by bearing against the drive shaft tunnel 27 of the vehicle floor 11, as best shown in FIGURES 2 and 4. The support panel is automatically positioned in its support location when the folding floor panel is extended and is swung into a storage position, shown in FIGURE 3, when the panel is folded into the upright position. The mechanism which accomplishes this function is best shown in FIGURES 4 and 5 and includes a driving link 28 which actuates the support panel by means of a parallelogram linkage system. The driving link 28 is pinned at 29 to the seat back section 12 and to parallel link 31 at 32. The parallel link 31 is pinned at 33 to the support panel 25. A timing link 34 is provided which is pinned at 35 to the extension section 18 and 36 to the parallel link 31. Pins 33, 35 and 36 and hinge 26 thus define the corners of the parallelogram and this parallelogram linkage system maintains the link 31 and the extension section 18 parallel at all times.

In operation the floor panel may be folded from the cargo carrying positions of FIGURES 2, 4 and 5 by lifting extension section 18. As this section pivots at hinge 17 drive link 28 acts on the parallelogram linkage system in such a manner that parallel link 31 is drawn toward the hinge 17. This causes support panel 25 to swing toward extension section 18. The phantom view of FIGURE 5 shows these members in a partially folded position. Continued folding of the extension section 18 causes the support panel 25 to swing flush against section 18 when section 18 has been brought into abutting relation with the seat back section 12. The folded sections may then be rotated about brackets 13 into the upright position shown in FIGURE 1. When opening the folding floor panel from the position shown in FIGURE 1 to its cargo carrying position, drive link 28 again automatically places the support panel in its support position through its action upon the parallelogram linkage system in a manner opposite to that previously described.

In order to prevent rattles in the support panel 25 and its related parallelogram linkage system it is desirable to preload this assembly in each of its positions by means of a spring. It has been found that drive link 28 may satisfactorily serve as such a spring. This is accomplished by constructing drive link 28 as a curved member formed of a resilient material, preferably sheet steel. Drive link 28 thus preloads the support panel and its actuating mechanism in both the folded position shown in FIGURES 1 and 3 and the cargo carrying position shown in FIGURES 2 and 4.

It will be understood that the invention is not to be limited to the exact construction shown and described but that various changes and modifications may be made without departing from the spirit and scope of the invention as defined in the appended claims.

I claim:

1. In a vehicle body having a foldable floor panel hinged at one of its ends to the vehicle body and adapted to be raised from an extended substantially horizontal position into a folded and substantially upright position to form a seat back, a support member pivotally connected to the distal end of said floor panel intermediate the sides thereof providing vertical support for said end when said panel is in said extended position, linkage means pivotally connected to said support member and said panel, and a member extending between said linkage means and said panel, said last mentioned member causing said linkage means to swing said support member against one surface of said foldable floor panel as the panel is folded to form said seat back.

2. In a vehicle body, a foldable floor panel comprising a pair of panel sections hinged to each other, one of said sections also being hinged to said vehicle body, said foldable panel being adapted to be raised from an extended cargo carrying position to a folded substantially upright position to form a seat back, a support member pivotally connected adjacent the free end of the other of said sections to provide vertical support for the latter in the extended position of said floor panel, and a linkage system operatively connected to said support member, said linkage system being constructed and arranged to swing said support member against said other section upon said floor panel being folded to form said seat back.

3. In a vehicle body, a foldable floor panel comprising a pair of panel sections hinged to each other, one of said sections also being hinged to said vehicle body, said foldable panel being adapted to be raised from an extended cargo carrying position to a folded substantially upright position to form a seat back, a support member pivotally connected adjacent the free end of the other of said sections to provide vertical support for the latter in the extended position of said floor panel, and a linkage system operatively connected to said support member, said linkage system including a driving member coupled to said one section, said linkage system being constructed and arranged to swing said support member against said other section upon said floor panel being folded to form said seat back.

4. In a vehicle body, a foldable floor panel comprising a pair of panel sections hinged to each other, one of said sections also being hinged to said vehicle body, said foldable panel being adapted to be raised from an extended cargo carrying position to a folded substantially upright position to form a seat back, a support member pivotally connected to the other of said sections adjacent the free end of the latter to provide vertical support for said free end in the extended position of said floor panel, and a linkage system interposed between said other section and said support panel, said linkage system including a driving member coupled to said one section, said linkage system being constructed and arranged to swing said support member against said other section upon said floor panel being folded to form said seat back.

5. In a vehicle body, a foldable floor panel comprising a pair of panel sections hinged to each other, one of said sections also being hinged to said vehicle body, said foldable panel being adapted to be raised from an extended cargo carrying position to a folded substantially upright position to form a seat back, a support member pivotally connected to the free end of the other of said sections to provide vertical support for the latter in the extended position of said floor panel, and a linkage system having parallelogram links operatively connected to said support member, said linkage system being constructed and arranged to move said support member against said other section upon said floor panel being folded to form said seat back.

6. In a vehicle body, a foldable floor panel comprising a pair of panel sections hinged to each other, one of said sections also being hinged to said vehicle body, said foldable panel being adapted to be raised from an extended cargo carrying position to a folded substantially upright position to form a seat back, a support member pivotally connected to the free end of the other of said sections to provide vertical support for the latter in the extended position of said floor panel, a parallelogram linkage system operatively connected to said support member, and a drive link coupled to said linkage system and said one section, said drive link being constructed and arranged to move said linkage system to fold said support member against said other section upon said floor panel being folded to form said seat back.

7. In a vehicle body, a foldable floor panel comprising a pair of panel sections hinged to each other, one of said sections also being hinged to said vehicle body, said foldable panel being adapted to be raised from an extended cargo carrying position to a folded substantially upright position to form a seat back, a support member pivotally connected to the free end of the other of said sections to provide vertical support for the latter in the extended position of said floor panel, a parallelogram linkage system interposed between said other section and said support member, and a drive link coupled to said linkage system and said panel, said drive link being constructed and arranged to move said linkage system to fold said support member against said other section upon said floor panel being folded to form said seat back.

References Cited in the file of this patent

UNITED STATES PATENTS

| | | |
|---|---|---|
| 2,646,324 | Bereman | July 21, 1953 |
| 2,888,296 | Huggins | May 26, 1959 |
| 2,916,325 | Estes | Dec. 8, 1959 |
| 2,926,950 | Hooverson | Mar. 1, 1960 |

FOREIGN PATENTS

| | | |
|---|---|---|
| 101,087 | Austria | Sept. 25, 1925 |
| 106,977 | Australia | Mar. 17, 1939 |
| 928,506 | Germany | June 2, 1955 |